United States Patent

Nakae et al.

Patent Number: 5,597,861
Date of Patent: Jan. 28, 1997

[54] WATERBORNE POLYESTER PAINT

[75] Inventors: Yasuhiko Nakae, Sakai; Shigeru Ishida, Osaka; Shoichi Mure, Neyagawa; Yasuhiro Shibata, Yokohama, all of Japan

[73] Assignee: Nippon Paint Company, Ltd., Osaka, Japan

[21] Appl. No.: 404,569

[22] Filed: Mar. 15, 1995

[30] Foreign Application Priority Data

Mar. 16, 1994 [JP] Japan ..................... 6-072551
Mar. 16, 1994 [JP] Japan ..................... 6-072552

[51] Int. Cl.$^6$ .................. C08J 3/00; C08K 3/20; C08L 51/00; C08L 67/00
[52] U.S. Cl. .............. 524/601; 524/539; 524/599; 524/602; 524/603; 524/604; 524/605; 524/878; 525/437; 525/441; 525/443; 525/444.5; 525/447; 427/458; 427/470; 427/372.2; 427/385.5
[58] Field of Search ..................... 524/539, 599, 524/601, 602, 603, 604, 605, 878; 525/437, 441, 443, 444.5, 447; 427/458, 470, 372.2, 385.5

[56] References Cited

U.S. PATENT DOCUMENTS

| | | | |
|---|---|---|---|
| 3,616,193 | 10/1971 | Lubowitz et al. | 161/190 |
| 4,430,368 | 2/1984 | Garland et al. | 524/539 |
| 4,752,532 | 6/1988 | Starka | 524/539 |
| 5,378,757 | 1/1995 | Blount, Jr. et al. | 525/437 |

*Primary Examiner*—Paul R. Michl
*Assistant Examiner*—Patrick Niland
*Attorney, Agent, or Firm*—Millen, White, Zelano & Branigan, P.C.

[57] ABSTRACT

A waterborne paint is provided by dissolving or dispersing a polyester resin and a crosslinker in an aqueous medium containing a base. The polyester resin contains a hydroxy-terminated polyalkadienediol having an average degree of polymerization from 5 to 50, a hydrogenated product thereof or a mixture thereof in a proportion from 1 to 30% by weight of the entire polyester-forming reactants, and has an acid number from 5 to 150, a hydroxyl number from 30 to 250. The paint is useful for forming a multilayer coating film on automobile bodies by applying the paint between an electrodeposition coating layer and a top coating layer.

18 Claims, No Drawings

WATERBORNE POLYESTER PAINT

BACKGROUND OF THE INVENTION

This invention relates to a waterborne polyester paint. More particularly, it relates to a waterborne polyester paint useful as an intermediate coating to be applied between an electrodeposition coating layer and a top coating layer for forming a multilayer coating film on a metallic substrate such as automobile bodies.

Recently, from the standpoint of economizing natural resources and energy and for environmental reasons, much interest has been placed on waterborne paints. It is common practice in automobile finish to apply an electrodeposition coating layer, an intermediate layer of primer or anti-chipping coating and a color coating layer, successively. If a waterborne paint is used as the intermediate coating, not only it is possible to avoid the use of organic solvents, but also the intermediate coating can be applied on the electrodeposition coating layer wet-on-wet and then baked the two layers baked simultaneously to reduce the number of steps.

Water-soluble or water-dispersible polyester resins have been conventionally used for such intermediate coatings as the vehicle resin thereof. The term "polyester resins" as used herein includes oil-free polyester resins and alkyd resins. The water-soluble polyester resins known in the prior art have a problem that the solution viscosity thereof increases as the degree of neutralization with a base increases. Therefore, if the viscosity is adjusted to a suitable level for application, the solids content of the paint necessarily decreases so that workability such as anti-sagging properties is greatly impaired. Conversely, if attempts are made to obtain satisfactory workability while retaining relatively high solids content by decreasing the degree of neutralization, the dispersion stability of the resin will be impaired. Since the viscosity is proportional to the resin molecular weight, satisfactory workability would be achieved even at a solids content and a degree of neutralization sufficient to exhibit satisfactory dispersion stability by using relatively low molecular weight resins. However, satisfactory film performance will not be obtained by the use of such low molecular weight resins.

Therefore, a need exists for a water-dispersible polyester resin for use as vehicle resins for intermediate coating formulations of which satisfactory workability and film performance are compatible.

SUMMARY OF THE INVENTION

The present invention provides a waterborne paint comprising (a) a polyester resin having an acid number from 5 to 150 and a hydroxyl number from 30 to 250 and containing as a polyhydric alcohol component a hydroxy-terminated polyalkadienediol having an average degree of polymerization from 5 to 50, a hydrogenated product of said polyalkadienediol or a mixture thereof in a proportion from 1 to 30% by weight of the entire polyester-forming reactants, and (b) a crosslinker, said polyester resin and said crosslinker being dispersed in an aqueous medium containing a neutralizing base.

Preferably, the polyester resin contains as a polycarboxylic acid component an aromatic polycarboxylic acid in a proportion from 10 to 60% by weight of the entire polyester-forming reactants.

In a preferred embodiment, the polyester resin contains addition-polymerized thereto a lactone in a proportion from 3 to 30% by weight of the entire polyester-forming reactants.

In another aspect, the present invention provides a method for forming a multilayer coating comprising an electrically deposited subcoating layer, an intermediate coating layer and a top coating layer successively on a metallic substrate such as automobile bodies. The method comprises the steps of applying the waterborne paint of the present invention onto said subcoating layer to form said intermediate coating layer, baking said intermediate coating layer, applying a pigmented coating composition and optionally a clear coating composition onto said intermediate coating layer to form said top coating layer, and baking the top coating layer. The waterborne paint of the present invention may be applied on said subcoating layer wet-on-wet and baked both layers simultaneously. Alternatively, it may be applied on the subcoating layer after baking thereof.

DETAILED DESCRIPTION OF THE PREFERRED EMBODIMENTS

As is well-known in the art, polyester resins are a polycondensate of a polybasic acid component and a polyhydric alcohol component. A small proportion of monocarboxylic acids, hydroxycarboxylic acids and/or lactoses may be incorporated to the acid and alcohol reactants. The reactants for producing alkyd resins additionally contain a drying or semi-drying oil or a fatty acid component thereof.

The polyester resin of the present invention contains from 10 to 60%, preferably from 20 to 50%, more preferably from 30 to 40% by weight of an aromatic polycarboxylic acid in the polyester-forming reactants. Examples of aromatic polycarboxylic acids inlcude phthalic anhydride, isophthalic acid, tetraphthalic acid, trimellitic anhydride, tetrabromophthalic anhydride, tetrachlorophthalic anhydride and pyromellitic anhydride. Isophthalic acid, terephthalic acid and trimellitic anhydride are preferable. If the proportion of the aromatic polycarboxylic acid is in excess, the viscosity of the resin will increase to an unacceptable level when neutralized and dissolved in water. The remainder of the acid component is a non-aromatic polycarboxylic acid such as hexahydrophthalic anhydride, tetrahydrophthalic anhydride, 1,4- and 1,3-cyclohexanedicar-boxylic acid, maleic anhydride, fumaric acid, succinic anhydride, adipic acid, sebacic acid, azelaic acid and the like. As stated before, a small portion of a hydroxycarboxylic acid such as 4-hydroxybenzoic acid, hydroxypivalic acid or 12-hydroxystearic acid, and a monocarboxylic acid such as benzoic or t-butylbenzoic acid may be included in the acid component.

The polyester resin of the present invention contains from 1 to 30%, preferably from 2 to 20%, more preferably from 3 to 15% by weight of a hydroxy-terminated polyalkadienediol, a hydrogenated product of said polyalkadienediol or a mixture thereof in the polyester-forming reactants. These diols are derived from a conjugated alkadiene oligomer or polymer having a degree of polymerization from 5 to 50. The diol preferably has a number average molecular weight from 1,000 to 4,000, more preferably from 1,500 to 3,000. 1,4-Polyisoprenediol, 1,4- or 1,2-polybutadienediol and a hydrogenated product thereof are preferable. A number of commercial products are available from various sources including a hydrogenated polyisoprenediol having a number average molecular weight (Mn) of 1,860 and an average degree of polymerization (D. P.) of 26 sold under the commercial name of EPOL, a polyisoprenediol having an Mn of 2,200 and an average D.P. of 34 sold under the commercial name of PIP, and a polybutadienediol having an Mn of 2,270 and an average D.P. of 42 sold under the commercial name of R-45HT, all being available from Idemitsu Petrochemical Co., Ltd., a hydrogenated polybutadienediol having an Mn of 2,200 and an average D.P. of 30 sold under the commercial name of POLYTEL HA, and a hydrogenated polybutadienediol having an Mn of 2,350 and an average D.P. of 42 sold under the commercial name of POLYTEL H; all being available from Mitsubishi Kasei Corporation. A high molecular weight polyester resin exhibiting a relatively low viscosity at a high degree of neutralization can be produced by the use of one of these diols as a portion of the polyhydric alcohol component. However, excessive use thereof will result in decreased water-dispersibility and also in decreased hardness of the cured film thereof.

The remainder of the polyol component is a nonpolymeric diol such as ethylene glycol, propylene glycol, 1,3-propanediol, 1,4-butanediol, 1,5-pentanediol, 1,6-hexanediol, 2,2-diethyl-1,3-propanediol, neopentyl glycol,1,9-nonanediol, 1,4-cyclohexanemethanol, neopentyl glycol hydroxypivalate, 2-butyl-2-ethyl-1,3-propanediol, 3-methyl-1,5-pentanediol, 2,2,4-trimethylpentanediol or hydrogenated bisphenol A; and a polyol having three or more hydroxyl groups such as trimethylolpropane, trimethylolethan e, glycerine or pentaerythritol.

Alkyd resins of the present invention additionally contain up to 30%, preferably up to 25% and more preferably from 10 to 20% by weight of a fatty acid having 6 or more carbon atoms or an oil containing said fatty acid in the entire reactants. Examples of oils and fatty acids include castor oil, linseed oil, dehydrated castor oil, tung oil, safflower oil, soybean oil, tall oil, coconut oil, palm oil and their fatty acids. Coconut oil and palm oil are preferable.

Other reactants which may be optionally incorporated in the polyester resin of the present invention include a monoepoxide compound such as CARDULA E sold by Shell Chemical and a lactone. Lactones may be addition reacted to the polyol polycarboxylate polyester chain to form a polyester chain by themselves. Examples of usable lactones for this purpose include β-propiolactone, dimethylpropio-lactone, butyrolactone, γ-valorolactone, ε-caprolactone, γ-caprolactone, γ-caprylolactone, crotolactone, δ-valerolactone and δ-caprolactone ε-Caprolactone is preferable. The proportion of lactones in the entire reactants may be up to 30%, preferably up to 20%, more preferably from 5 to 15% by weight. The addition of lactones is effective for improving the anti-chipping property of the multilayer coating.

The polyester resin of the present invention may be synthesized using the conventional method by subjecting the above reactants to a condensation reaction at a temperature, for instance, between 150° C. and 250° C. for 4 to 10 hours in the nitrogen gas atmosphere. The reaction may be carried out, as known in the art, in the presence of a catalyst such as dibutyltin oxide, antimony trioxide, zinc acetate, manganese acetate, cobalt acetate, calcium acetate, lead acetate, tetrabutyl titanate or tetraisopropyl titanate. The reaction may be initiated by placing the entire reactants into a reactor from the beginning or by adding the reactants portionwise an the reaction proceeds.

The molar ratios of the reactants and the reaction conditions should be adjusted such that the resulting polyester resin has an acid number from 5 to 150, preferably from 10 to 100, a hydroxyl number from 30 to 250, preferably from 50 to 150, and a weight average molecular weight from 10,000 to 200,000, preferably from 25,000 to 160,000.

The polyester resin of the present invention may be dissolved or dispersed in an aqueous medium containing from 0.3 to 1.2 and preferably from 0.5 to 1.0 equivalents of a neutralizing base relative to the acid number of the resin. Examples of neutralizing bases include inorganic bases such alkali metal hydroxides and ammonia, and amines such as methylamine, dimethylamine, trimethylamine, ethylamine, diethylamine, triethylamine, isopropylamine, diisopropylamine, diethylenetriamine, triethylenetetramine, mono-, di- and triethanolamine, 2-amino-2-methylpropanol, morpholine, N-methylmorpholine, piperazine, dimethylethanolamine, diethylethanolamie and dimethyldodecylamime. Triethylamine, dimethylethanolamine and diethylamine are preferable. Excessive use of the base may promote the hydrolysis of the resin upon storage and, therefore, should be avoided.

Commonly assigned Japanese Patent Publication No. 21227/91 discloses a method for forming a multilayer coating film including an intermediate or chipping sealer layer of a waterborne paint containing finely divided resin particles. The waterborne paint of the present invention may also contain finely divided particles of a carboxyl group-containing resin such as carboxyl group-containing acrylic or polyester resins having a particle size from 3 to 60 μm, preferably from 5 to 25 μm and an acid number from 15 to 300, preferably from 30 to 100. Incorporation of the resin particles into the paint formulation contributes not only to rendering the paint high solids but also to increasing the upper limit of film thickness free from sagging owing to a structural viscosity effect. The amount of resin particles is, if added, from 2:98 to 40:60, preferably from 5:95 to 30:70 in terms of the weight ratio to the polyester resin of the present invention. Excessive addition of the resin particles will adversely affect the flowability of the paint and, therefore, should be avoided.

The waterborne paint of the present invention contains a crosslinker reactive with the polyester resin and also with the resin particles if present. Examples of crosslinkers include epoxy resins, melamine resins, triglycidyl isocyanurate, dicyandiamide and the like. When the polyester resin is alkyd, the paint may contain a dryer such as cobalt naphthenate, lead naphthenate or zinc naphthenate. Melamine resins are preferable. Melamine resins are added at a weight ratio as solids to the polyester resin from 2:8 to 4:6. Typical examples of melamine resins include methylolmelamine produced by the condensation reaction of melamine with formaldehyde, and its derivatives produced by etherifying all or part of methylol groups with a lower alkanol such as methanol, ethanol, n-butanol or isobutanol. An acid catalyst such as p-toluenesulfonic acid, dodecylbenzenesulfonic acid, dinonylnaphthalenesulfonic acid or an amine salt thereof capable of dissociation at the baking temperature of the paint film may be added to the paint.

The waterborne paint of the present invention may be prepared by dissolving or dispersing the polyester resin in an aqueous medium containing a base to produce an aqueous varnish, and then adding the crosslinker to the varnish. The paint containing the resin particles may be prepared by dissolving or dispersing the polyester resin in an aqueous medium containing the whole amount or a portion of the base to produce an aqueous varnish, adding the resin particles and the remainder of the base, and stirring the mixture under heating. Alternatively, the whole amounts of the polyester resin, the base and the resin particles may be added to the aqueous medium at once followed by stirring the mixture under heating. In this case the amount of a neutralizing base should be sufficient to achieve from 30 to 120%, preferably from 50 to 100% neutralization of the polyester resin and the resin particles. A temperature from 35° C. to 95° C. is preferable when heating the mixture during the stirring step. The resin particles may be dispersed as primary particles in the paint if the above conditions are followed.

Usually the aqueous medium is deionized water. If desired, the aqueous medium may contain a small proportion of a water miscible organic solvent such as diethylene glycol monoethyl ether, diethylene glycol monobutyl ether, propylene glycol monomethyl ether, propylene glycol monoethyl ether, ethylene glycol monomethyl ether, methanol, ethanol, isopropanol, n-butanol, secondary butanol, t-butanol, dimethylformamide and N-methylpyrrolidone.

The waterborne paint of the present invention may contain conventional pigments. Examples thereof include coloring or rust-proof pigments such as titanium dioxide, white lead, zinc white, zinc sulfide, graphite, carbon black, yellow iron oxide, red iron oxide, phthalocyanine blue, phthalocyanine green, quinacridone, indanthrone, isoindolinone, perylene, anthrapyrimidine, benzimidazolone, cadmium yellow, cadmium red, chromium yellow or diketopyrrolopyrrole, and extender pigments such as calcium carbonate, barium sulfate, silica, silicate or aluminum hydroxide. Pigments are added to the paint by milling with a portion of the aqueous varnish of the polyester resin to prepare a pigment paste and then dispersing the paste in the remainder of the aqueous varnish optionally containing the resin particles. The proportion of the pigment in the paint is, when represented as the weight ratio of the pigment to the polyester resin as solids, is generally from 0.01:1 to 1:1, preferably from 0.03:1 to 0.9:1.

The waterborne paint of the present invention is useful as an intermediate coating for forming a multilayer coating on a metallic substrate. To this end, the paint is applied onto an electrocoating layer previously applied on the substrate before or after baking the electrocoating layer, and then baked independently or simultaneously with the electrocoating layer. Then the intermediate layer is overlaid with a top coating. The waterborne paint of the present invention can be applied on the electrocoating layer to a film thickness sufficient to exhibit satisfactory anti-chipping property without sagging to form a film free from pinholes and other surface defects. Thus, the paint find use, in particular, in forming a multilayer coating having excellent anti-chipping property and appearance on automobile bodies. The top coating generally comprises a base coat and a clear coat applied thereon. Depending upon the type of pigment contained in the base coat, it is possible for the top coating to be either a solid color finish or a metallic finish. The base coat and clear coat may be either a solvent type or a waterborne type. Preferably the top coating is formed by applying the clear coat on the base coat wet-on-wet and baking both coats simultaneously. This coating method and compositions are well-known in the coating industry and do not constitute a part of the present invention. Therefore, furthere details will not be required.

The invention is further illustrated by the following examples wherein all parts and % are by weight unless otherwise indicated.

EXAMPLES

Synthesis Example 1

| Material | Parts |
| --- | --- |
| Coconut oil | 155 |
| Trimethylolpropane | 248 |
| Isophthalic acid | 267 |
| Adipic acid | 59 |
| Neopentyl glycol | 33 |
| EPOL | 41 |
| Trimellitic anhydride | 40 |
| ε-Caprolactone | 77 |
| Dibutyltin oxide | 1.7 |
| Solvesso #150 | 75 |
| Butylcellosolve | 75 |

A reaction vessel equipped with a heating device, stirrer, nitrogen gas tube and distillation device was charged with 155 parts of coconut oil, 248 parts of trimethylolpropane and 1.7 parts of dibutyltin oxide. The mixture was melted under the nitrogen gas atmosphere by heating. The temperature was gradually raised to 210° C. until a transesterification was completed. After cooling the mixture, 267 parts of isophthalic acid, 59 parts of adipic acid, 33 parts of neopentyl glycol and 41 parts of EPOL (hydrogenated polyisoprenediol having an Mn of 1,860 and an average D.P. of 26 sold by Idemitsu Petrochemical Co., Ltd.) were added. Then the mixture was subjected to a dehydration-esterification reaction by raising the temperature gradually to 220° C. and maintaing this temperature until an acid number of 10 was reached. After cooling the mixture to 150° C., 40 parts of trimellitic anhydride were added to the vessel and allowed to react at the same temperature until an acid number of 40 was reached. Then 77 parts of ε-caprolactone were added and allowed to react at 140° C. for one hour. The resulting polyester resin was diluted with 75 parts of Solvesso #150 (aromatic hydrocarbon solvent sold by Esso) and 75 parts of butylcellosolve to obtain Polyester Resin Varnish I having a solids content of 83%. Hydroxyl number was 137, acid number was 37 and number average Mn (polystyrene standard) was 2,850.

100 parts of Polyester Resin Varnish I were mixed with 3.9 parts of dimethylethanolamine (corresponding 0.8 equivalents relative to the carboxyl group content of the resin) and then dispered in 103.6 parts of deionized water to obtain Aqueous Polyester Varnish A having 40% nonvolatile content and a satisfactory dispersibility.

Synthesis Examples 2–6

Polyester Varnish II–VI and Aqueous Polyester Varnish B–F were prepared as in Synthesis Example 1 using the following material recipes. Properties of resins and varnished are shown in Table 1 and Table 2.

Synthesis Example 2

| Material | Parts |
| --- | --- |
| Coconut oil | 155 |
| Trimethylolpropane | 248 |
| Isophthalic acid | 267 |
| Adipic acid | 59 |
| Neopentyl glycol | 33 |
| PIP* | 41 |
| Trimellitic anhydride | 40 |
| ε-Caprolactone | 77 |

-continued

| Material | Parts |
|---|---|
| Dibutyltin oxide | 1.7 |
| Solvesso #150 | 75 |
| Butylcellosolve | 75 |

*Polyisoprenediol having an Mn of 2,400 and an average D.P. of 34 sold by Idemitsu Petrochemical Co., Ltd.

Synthesis Examples 3–5

| Material | Parts |
|---|---|
| Coconut oil | 155 |
| Trimethylolpropane | 248 |
| Isophthalic acid | 267 |
| Adipic acid | 59 |
| Neopentyl glycol | 33 |
| Polyalkadienediol* | 41 |
| Trimellitic anhydride | 40 |
| ε-Caprolactone | 77 |
| Dibutyltin oxide | 1.7 |
| Solvesso #150 | 75 |
| Butylcellosolve | 75 |

*POLYTEL HA in Synthetic Example 3, hydrogenated polybutadienediol having an Mn of 2,200 and an average D.P. of 39 sold by Mitsubishi Kasei Corporation; POLYTEL H in Synthetic Example 4, hydrogenated polybutadienediol having an Mn of 2,350 and an average D.P. of 42 sold by Mitsubishi Kasei corporation; R-45HT in Synthetic Example 5, polybutadienediol havign an Mn of 2,270 and an average D.P. of 42 sold by Idemitsu Petrochemical Co., Ltd.

Synthesis Example 6

| Material | Parts |
|---|---|
| Coconut oil | 155 |
| Trimethylolpropane | 248 |
| Isophthalic acid | 267 |
| Adipic acid | 59 |
| Neopentyl glycol | 33 |
| EPOL | 41 |
| Trimellitic anhydride | 40 |
| Solvesso #150 | 68 |
| Butylcellosolve | 68 |

TABLE 1

|  | Synthesis Example | | | | | |
|---|---|---|---|---|---|---|
|  | 1 | 2 | 3 | 4 | 5 | 6 |
| Polyester Varnish | I | II | III | IV | V | VI |
| Diol content, % | 4.7 | 4.8 | 4.8 | 4.8 | 4.8 | 5.2 |
| Acid number, mg KOH/g | 37 | 34 | 35 | 35 | 36 | 40 |
| OH NUMBER, mg KOH/g | 137 | 134 | 135 | 135 | 136 | 150 |
| Mn[1] | 2730 | 3160 | 3070 | 3010 | 2980 | 2650 |
| Mw ($\times 10^3$)[1] | 28.6 | 152 | 123 | 109 | 87.6 | 27.5 |
| Nonvolatile, %[2] | 83 | 84 | 85 | 85 | 84 | 85 |

[1]GPC method, polystyrene standard
[2]Nonvolatile residue heated at 150° C. for 1 hour.

TABLE 2

| | Synthesis Example | | | | | |
|---|---|---|---|---|---|---|
| | 1 | 2 | 3 | 4 | 5 | 6 |
| Aqueous Varnish | A | B | C | D | E | F |
| Polyester Varnish I | 100 | | | | | |
| Polyester Varnish II | | 100 | | | | |
| Polyester Varnish III | | | 100 | | | |
| Polyester Varnish IV | | | | 100 | | |
| Polyester Varnish V | | | | | 100 | |
| Polyester Varnish VI | | | | | | 100 |
| Dimethylethanolamine | 3.9 | 3.6 | | 3.8 | 3.8 | 4.3 |
| Triethylamine | | | 4.3 | | | |
| Deionized water | 103.6 | 106.4 | 108.2 | 108.7 | 106.2 | 108.2 |
| Amount of base[1] | 0.8 | 0.8 | 0.8 | 0.8 | 0.8 | 0.8 |
| Nonvolatile, % | 40 | 40 | 40 | 40 | 40 | 40 |
| Dispersibility | Good | Good | Good | Good | Good | Good |

[1] Equivalent ratio to total carboxyl groups.

Synthesis Examples 7–10 (for comparison)

Polyester Varnish VII–X and Aqueous Polyester Varnish G–J were prepared as in Synthesis Example 1 using the recipes shown in Tabel 3. Properties of resins and varnishes are shown in Table 3 and Table 4.

TABLE 3

| | Synthesis Example | | | |
|---|---|---|---|---|
| | 7 | 8 | 9 | 10 |
| Polyester | VII | VIII | IX | X |
| Coconut oil | 155 | 185 | 95 | 154 |
| Trimethylopropane | 249 | 123 | 317 | 28 |
| Isophthalic acid | 289 | 182 | 352 | 289 |
| Adipic acid | 64 | 40 | 77 | 64 |
| Neopentyl glycol | 52 | 33 | 52 | 219 |
| EPOL | — | 356 | 51 | 47 |
| Trimellitic anhydride | 40 | 36 | — | 40 |
| ε-Caprolactone | 77 | 91 | 90 | 76 |
| Dibutyltin oxide | 1.7 | 2 | 2 | 1.7 |
| Solvesso #150 | 75 | 88 | 123 | 75 |
| Butylcellosolve | 75 | 88 | 123 | 75 |
| Diol content, % | 0 | 35.6 | 4.7 | 5.6 |
| Acid #, mg KOH/g | 35 | 29 | 9 | 35 |
| OH #, mg KOH/g | 135 | 50 | 136 | 29 |
| Mn | 2910 | 4230 | 6160 | 3090 |
| Mw (× 10³) | 22.3 | 212 | 27.4 | 28.4 |
| Nonvolatile | 84 | 85 | 80 | 84 |

TABLE 4

| | Synthesis Example | | | |
|---|---|---|---|---|
| | 7 | 8 | 9 | 10 |
| Aqueous Varnish | G | H | I | J |
| Polyester Varnish VII | 100 | | | |
| Polyester Varnish VIII | | 100 | | |
| Polyester Varnish IX | | | 100 | |
| Polyester Varnish X | | | | 100 |
| Diethanolamine | 3.8 | 3.1 | 0.6 | 3.7 |
| Deionized water | 106.2 | 109.4 | 99.4 | 106.3 |
| Amount of base[1] | 0.8 | 0.8 | 1.2 | 0.8 |
| Nonvolatile, % | 40 | 40 | 40 | 40 |
| Dispersibility | Good | Good | Resin settling | Good |

[1] Equivalent ratio to total carboxyl groups

Examples 1–6 and Comparative Examples 1–3

Pigment Paste 100 parts of each of Aqueous Polyester Varnish A through J were mixed with 30 parts of deionized water and 130 parts of rutile type titanium dioxide in a container. The mixture was then transferred to a paint conditioner and milled at room temperature for 1 hour with the aid of a glass beads disintegration medium to prepare a pigment paste having a particle size less than 5 μm and a nonvolatile content of 65.4%.

Paint Formulation

Each of Aqueous Polyester Varnish A through J, a pigment paste produced from the same aqueous polyester varnish, hexamethoxymethylolmelamine and p-toluenesulfonic acid were blended in proprotions shown in Table 5. Each paint was diluted with deionized water to 30 second/20° C. of Ford cup #4 and then evaluated its performance accoridng to the following methods. Results are shown in Table 5.

Evalution Method

1) Gloss: The paint was applied on a tinplate and baked at 150° C. for 30 minutes followed by testing the resulting film for the gloss according to JIS K-5400.

2) Pecil hardness: Same as above.

3) Solvent resistance: The film was rubbed with a piece of gauze impregnated with xylene at 10 reciprocations and the appearance of the film was visually observed.

4) Pinhole-free thickness limit: The paint was sprayed on a steel plate of 10×30 cm size held in an inclined position to form a thickness gradient having a maximum thickness of 70 μm. After holding in a coating booth horizontally at 25° C. at 70% R.H., the film was baked at 150° C. for 30 minutes. The pinhole-free thickness limit was determined as the maximum thickness below which pinholes were not found in the film.

5) Susceptivity to craters: The paint was applied on a tinplate of 30×40 cm size first by spray coating to a film thickness of about 30 μm. After one minute, the same paint was applied onto the spray coated film by dust coating and the film was observed for the presence minute craters.

6) Anti-chipping: A zinc phosphate-treated steel plate was coated with a cathodic electrodeposition paint (POWER TOP UP-50, Nippon Paint Co., Ltd.) to a dry film thickness of about 25 μm and then baked at 160° C. for 30 minutes. Then, each of the paints of Examples and Comparative Examples was sprayed on the substrate to a dry film thickness of about 30 μm and baked at 150° C. for 30 minutes. Immediately after cooling, the substrate was finished with a top coating by applying a base coat composition (ORGA TO-521, Nippon Paint Co., Ltd.) to a dry film thickness of about 16 μm, applying an acrylic-melamine clear coat composition (ORGA TO-563, Nippon Paint Co., Ltd.) on the base coat wet-on-wet to a dry film thickness of about 40 μm after setting the base coat for about 7 minutes, and finally baking both coats at 140° C. for 20 minutes simultaneously. This specimen was cooled to −30° C. and attached to the specimen holder of a stone-impinging tester (Suga Testing Instruments Co., Ltd.) so that the orientation of the coated surface was at 60° relative to the direction of throwing stones. Then 100 g of crashed stones of No. 7 size were impinged against the specimen at an air pressure of 3 kg/cm$^2$. The anti-chipping property was determined depending upon the number and size of damaged areas and represented by the following schedule.

Very good: Substantially no chipped spot is present.

Good: A small number of tinny chipped spots are present.

Poor: Large chipped spots are present in places.

Bad: Large chipped spots are present in the whole area.

7) Sagging-free thickness limit: A steel plate of 10 cm × 30 cm size was drilled along the axial center line a row of holes of 5 mm diameter. Using this plate, a paint film was formed to have a thickness gradient having a maximum thickness of about 70 μm as in the pinhole-free thickness limit test. After holding in a coating booth vertically at 25° C. at 70% R.H., the film was baked at 150° C. for 30 minutes. The limit was determined as the maximum thickness below which the paint did not sag into the drilled holes.

Examples 7–13 and Comparative Examples 4–6

Using finely divided particles (less than 45 μm in particle size) of a polyester resin having an acid number of 53, a Tg of 109° C. and an M.W. of 3,800 (FINEDICS M6107, Dainippon Ink And Chemicals, Inc.), various paints were prepared according to the formulations shown in Table 6. The resin particles were gradually added to each of Aqueous Varnish A through J with stirring and heating. Stirring was continued for 15 minutes at 70° C. to obtain a stable dispersion. To the dispersion were added the pigments paste of Examples 1–6 and Comparative Examples 1–3 produced from the same polyester resin, hexamethoxymethylolmelamine and p-toluenesulfornic acid successively. The resulting paints were evaluated as in Examples 1–6 and Comparative Examples 1–3. Results are shown in Table 6.

TABLE 5

|  | Example | | | | | |
| --- | --- | --- | --- | --- | --- | --- |
|  | 1 | 2 | 3 | 4 | 5 | 6 |
| Aqueous varnish, parts | A | B | C | D | E | F |
|  | 111 | 111 | 111 | 111 | 111 | 111 |
| Pigment paste, parts | 200 | 200 | 200 | 200 | 200 | 200 |
| Hexamethoxymethylol-melamine, parts | 25 | 50 | 19 | 25 | 25 | 25 |
| p-Toluenesulfonic acid, parts | 0.5 | 0.63 | 0.47 | 0.5 | 0.5 | 0.5 |
| Diol content, % | 4.7 | 4.8 | 4.8 | 4.8 | 4.8 | 5.1 |
| Gloss[1)] | 85 | 87 | 88 | 89 | 90 | 85 |
| Pencil hardness[2)] | H | HB | H | H | H | 2H |
| Solvent resistance[3)] | Good | Good | Good | Good | Good | Good |
| Pinhole-free limit, μm[4)] | 65 | 65 | 60 | 65 | 65 | 60 |
| Susceptivity to craters[5] | Good | Good | Good | Good | Good | Good |
| Anti-chipping[6)] | Very Good | Very Good | Very Good | Very Good | Very Good | Good |
| Sagging-free limit, μm[7)] | 40 | 40 | 40 | 40 | 45 | 40 |

|  | Comparative Example | | |
| --- | --- | --- | --- |
|  | 1 | 2 | 3 |
| Aqueous varnish, parts | G | H | I |
|  | 111 | 111 | 111 |
| Pigment paste, parts | 200 | 200 | 200 |
| Hexamethoxymethylol-melamine, parts | 25 | 25 | 25 |
| p-Toluenesulfonic acid, parts | 0.5 | 0.5 | 0.5 |
| Diol content, % | 0 | 35.6 | 5.6 |
| Gloss[1)] | 90 | 65 | 90 |
| Pencil hardness[2)] | H | 6B> | 6B> |
| Solvent resistance[3)] | Good | Good | Dissolved |
| Pinhole-free limit, μm[4)] | 40 | 55 | — |
| Susceptivity to craters[5] | Bad | Fair | — |
| Anti-chipping[6)] | Poor | Very Good | — |
| Sagging-free limit, μm[7)] | 35> | 40 | — |

TABLE 6

|  | Example | | | | | | |
|---|---|---|---|---|---|---|---|
|  | 7 | 8 | 9 | 10 | 11 | 12 | 13 |
| Aqueous varnish, parts | A | B | C | D | E | G | A |
|  | 97 | 97 | 97 | 97 | 97 | 88 | 88 |
| Pigment paste, parts | 235 | 235 | 235 | 235 | 235 | 235 | 235 |
| Resin particles, parts | 17.6 | 17.6 | 17.6 | 17.6 | 17.6 | 17.6 | 17.6 |
| Hexamethoxymethylol-melamine, parts | 25 | 50 | 19 | 25 | 25 | 25 | 25 |
| p-Toluenesulfonic acid, parts | 0.5 | 0.63 | 0.47 | 0.5 | 0.5 | 0.5 | 0.5 |
| EPOL, parts |  |  |  |  |  | 3.7 | 3.7 |
| Diol content, % | 4.7 | 4.8 | 4.8 | 4.8 | 4.8 | 4.9 | 9.4 |
| Resin particles/Aqueous resin ratio as solids | 19/81 | 19/81 | 19/81 | 19/81 | 19/81 | 19/81 | 19/81 |
| Gloss[1] | 86 | 89 | 88 | 89 | 90 | 87 | 85 |
| Pencil hardness[2] | H | HB | H | H | H | HB | HB |
| Solvent resistance[3] | Good | Good | Good | Good | Good | Good | Good |
| Pinhole-free limit, μm[4] | 60 | 60 | 60 | 65 | 65 | 60 | 65 |
| Susceptivity to craters[5] | Good | Good | Good | Good | Good | Good | Good |
| Anti-chipping[6] | Very Good | Very Good | Very Good | Very Good | Very Good | Very Good | Very Good |
| Sagging-free limit, μm[7] | 50 | 50 | 50 | 55 | 55 | 50 | 55 |

|  | Comparative Example | | |
|---|---|---|---|
|  | 4 | 5 | 6 |
| Aqueous varnish, parts | G | H | J |
|  | 97 | 97 | 97 |
| Pigment paste, parts | 235 | 235 | 235 |
| Resin particles, parts | 17.6 | 17.6 | 17.6 |
| Hexamethoxymethylol-melamine, parts | 25 | 25 | 25 |
| p-Toluenesulfonic acid, parts | 0.5 | 0.5 | 0.5 |
| Diol content, % | 0 | 35.6 | 5.6 |
| Resin particles/Aqueous resin ratio as solids | 19/81 | 19/81 | 19/81 |
| Gloss[1] | 88 | 65 | 90 |
| Pencil hardness[2] | H | 6B> | 6B> |
| Solvent resistance[3] | Good | Good | Dissolved |
| Pinhole-free limit, μm[4] | 35 | 55 | — |
| Susceptivity to craters[5] | Bad | Fair | — |
| Anti-chipping[6] | Poor | Very Good | — |
| Sagging-free limit, μm[7] | 55 | 50 | — |

Example 14

A zinc phosphate-treated steel plate of 0.8 mm thickness was coated with an cathodic electrodeposition paint (POWER TOP PU-50, Nippon Paint Co., Ltd.) to a dry film thickness of about 25 μm, rinsed with water and pre-heated. Then the waterborne paint of Example 7 was sprayed thereon wet-on-wet to a dry film thickness of about 35 μm and baked both coats at 150° C. for 30 minutes simultaneously. Thereafter a base coat composition shown below (adjusted to 14 seconds in Fordcup #4) was applied to a dry film thickness of about 15 μm by air sprayinn in two stages. After standing for 7 minutes, a clear coat composition shown below (adjusted to 20 seconds in Fordcup #4) was applied wet-on-wet to a dry film thickness of about 40 μm by air spraying. After standing for 10 minutes, both coating layers were baked at 140° C. for 30 minutes simultaneously. The resulting maltilayer coating film possessed a gloss greater than 95 and exhibited an excellent finish including flowability and sharpness without any defects such as pinholes and sagging.

Base Coat Formulation

| Material | Parts |
|---|---|
| ALUPASTE 7160N(aluminum flake paste sold by Toyo Aluminum Co., Ltd., Al flake content 65%) | 10.9 |
| ARUMATEX NT-U-448 (thermosetting acrylic varnish sold by Mitsui Toatsu Chemicals, Inc., 48% solids) | 66.9 |
| UVAN 20N-60(melamine resin varnish sold by Mitsui Toatsu Chemicals, Inc., 60% solids) | 13.5 |
| Toluene | 6.4 |
| n-Butanol | 2.0 |
| Triethylamine | 0.5 |

Clear Coat Formulation

| Material | Parts |
|---|---|
| DAIANAL HR-554(thermosetting acrylic varnish sold Mitsubishi Rayon Co., | 58.3 |

-continued

| Material | Parts |
| --- | --- |
| Ltd., 60% solids) | |
| ACR-461(thermosetting acrylic varnish sold be NipponPaint Co., Ltd., 55% solids) | 63.6 |
| UVAN 20N-60 | 50.0 |
| TINUBIN 900 (UV absorber sold by Ciba-Geigy) | 2.0 |
| SANOL LS-292 (antioxidant sold by Sankyo Yuki Gosei Co., Ltd.) | 1.0 |
| n-Butanol | 1.3 |
| SOLVESSO #100 | 5.0 |

Example 15

Example 14 was followed except that the following waterborne base coat composition was replaced for the solvent type base coat composition used in Example 14. The waterborne base coat composition (adjusted to 30 seconds in Fordcup #4) was air sprayed to a dry film thickness of about 15 μm in two stages and preheated at 80° C. for 5 minutes before applying the same clear coat composition. The resulting multilayer coating film possessed a gloss greater than 90 and exhibited an excellent finish including flowability and sharpness without any defects such as pinholes and sagging.
Base Coat Formulation

| Material | Parts |
| --- | --- |
| ALUPASTS 7160N | 15 |
| CYMEL 303 (melamine resin sold by Mitsui Toatsu Chemicals, Inc.) | 30 |
| PHOSPHOREX A-180L (isostearyl phosphate sold by Sakai Chemical Industry, Co., Ltd.) | 2 |
| Aqueous acrylic varnish* | 112 |
| Polyurethane emulsion (33% solids, acid number 16.2) | 43 |

*An aqueous varnish (50% solids) of an acrylic resin having an Mn of 12,000, OH number of 70 and acid number of 58 produced by polymerizing the following monomer mixture.

| Material | Parts |
| --- | --- |
| Butylcellosolve | 76 |
| Styrene | 15 |
| Methyl methacrylate | 63 |
| 2-Hydroxylethyl methacrylate | 48 |
| n-Butyl acrylate | 117 |
| Methacrylic acid | 27 |
| Acrylamide | 30 |
| Azobisbutyronitrile | 3 |
| Dimethylethanolamine | 28 |
| Deionized water | 200 |

What is claimed is:

1. A water-based paint comprising
   (a) polyester resin having an acid number from 5 to 150 and a hydroxyl number from 30 to 150 and containing a hydroxy-terminated polyalkadienediol having an average degree of polymerization from 5 to 50, a hydrogenated product of said polyalkadienediol or a mixture thereof in a proportion from 1 to 30% by weight of the entire polyester-forming reactants,
   (b) a crosslinker for the resin,
   (c) a neutralizing base, and
   (d) an aqueous medium, said polyester resin and said crosslinker being dispersed in said aqueous medium.

2. The water-based paint according to claim 1, said polyester resin contains an aromatic polycarboxylic acid in a proportion from 10 to 60% by weight of the entire polyester-forming reactants.

3. The water-based paint according to claim 2, wherein said polyester resin is an alkyd resin further containing a fatty acid having 6 or more carbon atoms or an oil containing a fatty acid component which is a fatty acid having 6 or more carbon atoms, in a proportion up to 30% by weight of the entire polyester-forming reactants.

4. The water-based paint according to claim 2, said polyester resin contains a lactone addition-reacted to said resin in a proportion from 3 to 30% by weight of the entire polyester-forming reactants including said lactone.

5. The water-based paint according to claim 4, wherein said lactone is ε-caprolactone.

6. The water-based paint according to claim 1, wherein said polyester resin has a weight average molecular weight from 10,000 to 200,000.

7. The water-based paint according to claim 6, wherein said polyalkadienediol is a polyisoprenediol or polybutadienediol having a number average molecular weight from 1,000 to 4,000.

8. The water-based paint according to claim 1, wherein said crosslinker is a melamine resin.

9. The water-based paint according to claim 8, wherein the wright ratio of said polyester resin to said melamine resin is from 6:4 to 8:2 as solids.

10. The water-based paint according to claim 1 further comprising uniformly dispersed therein an amount of finely divided particles of a carboxyl group-containing resin.

11. The water-based paint according to claim 10, wherein the weight ratio of said resin particles to said polyester resin is from 2:98 to 40:60 as solids.

12. The water-based paint according to claim 1, wherein said polyester resin contains an aromatic polycarboxylic acid in a proportion from 10 to 60% by weight of the entire polyester-forming reactants; wherein said polyester resin is an alkyd resin further containing a fatty acid having 6 or more carbon atoms or an oil containing a fatty acid component which is a fatty acid having 6 or more carbon atoms, in a proportion up to 30% by weight of the entire polyester-forming reactants, or wherein said polyester resin has a lactone addition-reacted thereto in a proportion from 3 to 30% by weight of the entire polyester-forming reactants including said lactone; wherein said polyester resin has a weight average molecular weight from 10,000 to 200,000; wherein said polyalkadienediol is a polyisoprenediol or polybutadienediol having a number average molecular weight from 2,000 to 4,000; wherein said crosslinker is a melamine resin; wherein the weight ratio of said polyester resin to said melamine resin is from 6:4 to 8:2 as solids; wherein said water-based paint further comprises uniformly dispersed therein an amount finely divided particles of carboxyl group-containing resin; and wherein the weight ratio of said resin particles to said polyester resin is from 2:98 to 40:60 as solids.

13. In a method for forming a multilayer coating film on a metallic substrate comprising the steps of applying onto said substrate an electrodeposition coating layer, an intermediate coating layer and a top coating layer successively, the improvement wherein said intermediate coating layer consists of the waterborne paint of claim 1.

14. The method according to claim 13, wherein said waterborne paint is applied and the paint film so applied is baked simultaneously with said electrodeposition coating layer.

15. The method according to claim 13, wherein said substrate is an automobile body.

16. In a method for forming a multilayer coating film on a metallic substrate comprising the steps of applying onto said substrate an electrodeposition coating layer, an intermediate coating layer and a top coating layer successively, the improvement wherein said intermediate coating layer consists of the waterborne paint of claim 10.

17. The method according to claim 16, wherein said waterborne paint is applied on said electrodeposition coating layer wet-on-wet and the paint film so applied is baked simultaneously with said electrodeposition coating layer.

18. The method according to claim 16, wherein said substrate is an automobile body.

* * * * *

UNITED STATES PATENT AND TRADEMARK OFFICE
CERTIFICATE OF CORRECTION

PATENT NO. : 5,597,861
DATED : January 28, 1997
INVENTOR(S) : Yasuhiko NAKAE et al.

It is certified that error appears in the above-indentified patent and that said Letters Patent is hereby corrected as shown below:

Claim 9, column 16; line 29: Change "wright" to read -- weight --.

Signed and Sealed this

Fifteenth Day of April, 1997

Attest:

BRUCE LEHMAN

Attesting Officer     Commissioner of Patents and Trademarks